(12) United States Patent
Mei et al.

(10) Patent No.: US 8,249,366 B2
(45) Date of Patent: Aug. 21, 2012

(54) MULTI-LABEL MULTI-INSTANCE LEARNING FOR IMAGE CLASSIFICATION

(75) Inventors: Tao Mei, Beijing (CN); Xian-Sheng Hua, Beijing (CN); Shipeng Li, Palo Alto, CA (US); Zheng-Jun Zha, Hefei (CN)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 12/140,247

(22) Filed: Jun. 16, 2008

(65) Prior Publication Data

US 2009/0310854 A1 Dec. 17, 2009

(51) Int. Cl.
*G06K 9/00* (2006.01)
(52) U.S. Cl. ....................................... 382/224
(58) Field of Classification Search ......................... None
See application file for complete search history.

(56) References Cited

U.S. PATENT DOCUMENTS

| | | | |
|---|---|---|---|
| 6,711,278 B1 | 3/2004 | Gu et al. | |
| 6,728,391 B1 | 4/2004 | Wu et al. | |
| 7,065,250 B1 | 6/2006 | Lennon | |
| 7,194,134 B2 | 3/2007 | Bradshaw | |
| 2005/0047663 A1 | 3/2005 | Keenan et al. | |
| 2006/0098871 A1* | 5/2006 | Szummer | 382/173 |
| 2006/0104542 A1 | 5/2006 | Blake et al. | |
| 2006/0115145 A1* | 6/2006 | Bishop et al. | 382/155 |
| 2006/0291721 A1 | 12/2006 | Torr et al. | |
| 2007/0189602 A1 | 8/2007 | Rao et al. | |
| 2008/0112625 A1* | 5/2008 | Cooper | 382/228 |
| 2009/0274434 A1* | 11/2009 | Mei et al. | 386/52 |
| 2011/0075920 A1* | 3/2011 | Wu et al. | 382/160 |

OTHER PUBLICATIONS

Quattoni et al. (Oct. 2007) "Hidden-state conditional random fields." IEEE Trans. on Pattern Analysis and Machine Intelligence, vol. 29 No. 10, pp. 1848-1852.*
Zhou (2007) "Mining ambiguous data with multi-instance multi-label representation." $3^{rd}$ Int'l Conf. on Advanced Data Mining and Applications.*
Zha et al. (Jun. 2008) "Joint multi-label multi-instance learning for image classification." Proc. 2008 IEEE Conf. on Computer Vision and Pattern Recognition.*
Li, et al., "Multiresolution Image Classification by Hierarchical Modeling with Two-Dimensional Hidden Markov Models", IEEE Transactions on Information Theory, vol. 46, No. 5, Aug. 2000, pp. 1826-1841.
Kumar, et al., "Man-Made Structure Detection in Natural Images Using a Causal Multiscale Random Field", In proceeding of the IEEE International Conference on Computer Vision and Pattern Recognition (CVPR), vol. 1, 2003, pp. 8.

(Continued)

*Primary Examiner* — Bhavesh Mehta
*Assistant Examiner* — Barry Drennan
(74) *Attorney, Agent, or Firm* — Gonzalez Saggio & Harlan LLP

(57) ABSTRACT

Described is a technology by which an image is classified (e.g., grouped and/or labeled), based on multi-label multi-instance data learning-based classification according to semantic labels and regions. An image is processed in an integrated framework into multi-label multi-instance data, including region and image labels. The framework determines local association data based on each region of an image. Other multi-label multi-instance data is based on relationships between region labels of the image, relationships between image labels of the image, and relationships between the region and image labels. These data are combined to classify the image. Training is also described.

20 Claims, 5 Drawing Sheets

OTHER PUBLICATIONS

Zhu, et al., "Semi-Supervised Learning Using Gaussian Fields and Harmonic Functions", Proceedings of the Twentieth International Conference on Machine Learning (ICML-2003), 2003, vol. 20, pp. 9.

Chang, et al., "LIBSVM: A Library for Support Vector Machines", Sep. 7, 2001, pp. 1-20.

Chen, et al., "Image Categorization by Learning and Reasoning with Regions", Journal of Machine Learning Research, vol. 5, 2004, Copyright 2004, Yixin Chen and James Z. Wang, pp. 913-939.

Dempster, et al., "Maximum Likelihood from Incomplete Data via the EM Algorithm", Journal of the Royal Statistical Society. Series B (Methodological), vol. 39, No. 1. 1977, pp. 39.

Deng, et al., "Unsupervised Segmentation of Color-Texture Regions in Images and Video", May 10, 2001, pp. 1-27.

Duygulu, et al., "Object Recognition as Machine Translation: Learning a Lexicon for a Fixed Image Vocabulary", Seventh European Conference on Computer Vision, vol. 2353, 2002, pp. 15.

Gartner, et al., "Multi-Instance Kernels", Proceedings of the Nineteenth International Conference on Machine Learning, 2002, pp. 8.

Geman, et al., "Stochastic Relaxation, Gibbs Distributions, and the Bayesian Restoration of Images", Readings in Uncertain Reasoning, Aug. 26, 2002, pp. 1-3.

Godbole, et al., "Discriminative Methods for Multi-Labeled Classification", vol. 3056, 2004, pp. 9.

He, et al., "Multiscale Conditional Random Fields for Image Labeling", proceedings of the 2004 IEEE Computer Society Conference on Computer Vision and Pattern Recognition, IEEE Computer Society, pp. 1-8.

Hinton, "Training Products of Experts by Minimizing Contrastive Divergence", Technical Report GCNU TR 2000-004, Gatsby Computational Neuroscience Unit, 2000, pp. 1-19.

Kang, et al., "Correlated Label Propagation with Application to Multi-Label Learning", Proceedings of the 2006 IEEE Computer Society Conference on Computer Vision and Pattern Recognition (CVPR'06), vol. 2, 2006, IEEE.

Kumar, et al., "Discriminative Random Fields: A Discriminative Framework for Contextual Interaction in Classification", Proceedings of the 2003 IEEE International Conference on Computer Vision (ICCV '03), vol. 2, 2003, pp. 8.

Lee, et al., "Support Vector Random Fields for Spatial Classification", vol. 3721, 2005, pp. 1-15.

Maron, et al., "A Framework for Multiple Instance Learning", Proceedings of the 1997 conference on Advances in Neural Information Processing Systems 10, 1998, pp. 7.

Qi, et al., "Correlative Multi-Label Video Annotation", Proceedings of the 15th international conference on Multimedia, 2007, International Multimedia Conference, pp. 17-26.

Wang, et al., "Hidden Conditional Random Fields", Conference on Computer Vision and Pattern Recognition, 2006, pp. 7.

Shotton, et al., "Textonboost: Joint Appearance, Shape and Context Modeling for Multi-Class Object Recognition and Segmentation", Proceedings of the European Conference on Computer Vision (2006), pp. 1-14.

Xu, et al., "Logistic Regression and Boosting for Labeled Bags of Instances", vol. 3056, 2004, pp. 10.

Chen, et al., "Miles: Multiple-Instance Learning Via Embedded Instance Selection", IEEE Transactions on Pattern Analysis and Machine Intelligence, vol. 28, No. 12, Dec. 2006, pp. 1-13.

Zhang, et al., "Em-dd: An Improved Multiple-Instance Learning Technique", In Neural Information Processing Systems 14, 2001, pp. 8.

Zhou, et al., "Multi-Instance Multi-Label Learning with Application to Scene Classification", In Advances in Neural Information Processing System, 2006, pp. 8.

\* cited by examiner

US 8,249,366 B2

MULTI-LABEL MULTI-INSTANCE LEARNING FOR IMAGE CLASSIFICATION

BACKGROUND

With the proliferation of digital photography, automatically classifying images is useful in many applications. To classify an image, the image needs to be semantically understood. Classification is typically formulated as a multi-class or multi-label learning problem.

In a multi-class image classification setting, each image is categorized into one (and only one) category of a set of predefined categories. In other words, only one label is assigned to each image in this setting. In a multi-label setting, which is generally closer to real world applications, each image is assigned one or multiple labels from a predefined label set, such as "sky," "mountain," and "water" for a scenery image showing those scenic items.

While multi-class image and solutions are used, both have drawbacks. In general such drawbacks include somewhat poor classification accuracy, as well as classification accuracy that varies depending on the types of images in the dataset.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an image is classified (e.g., grouped and/or labeled) based on multi-label multi-instance data learning-based classification. An image is processed into multi-label multi-instance data, including determining local association data based on each region of an image. Further, the data is based on relationships between region labels of the image, relationships between image labels of the image, and relationships between the region and image labels. These data are combined to classify the image.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a framework that classifies images based upon a multi-label multi-instance solution. Unlike existing solutions, an integrated multi-label multi-instance learning framework is provided that captures the connections between semantic labels and regions, as well as the correlations among the labels, in a single formulation. The framework is flexible to capture the various dependencies among the regions, such as spatial relations.

As will be understood, the multi-label multi-instance learning framework described herein addresses the intrinsic reason of the multi-label phenomena and directly models the latent semantic meaning of regions. In contrast with techniques that model individual labels independently, multi-label multi-instance learning mechanisms model both the individual labels and their interactions in a manner that is flexible to capture various dependencies among an image's regions.

It should be understood that any examples set forth herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image processing in general.

Figure 1:
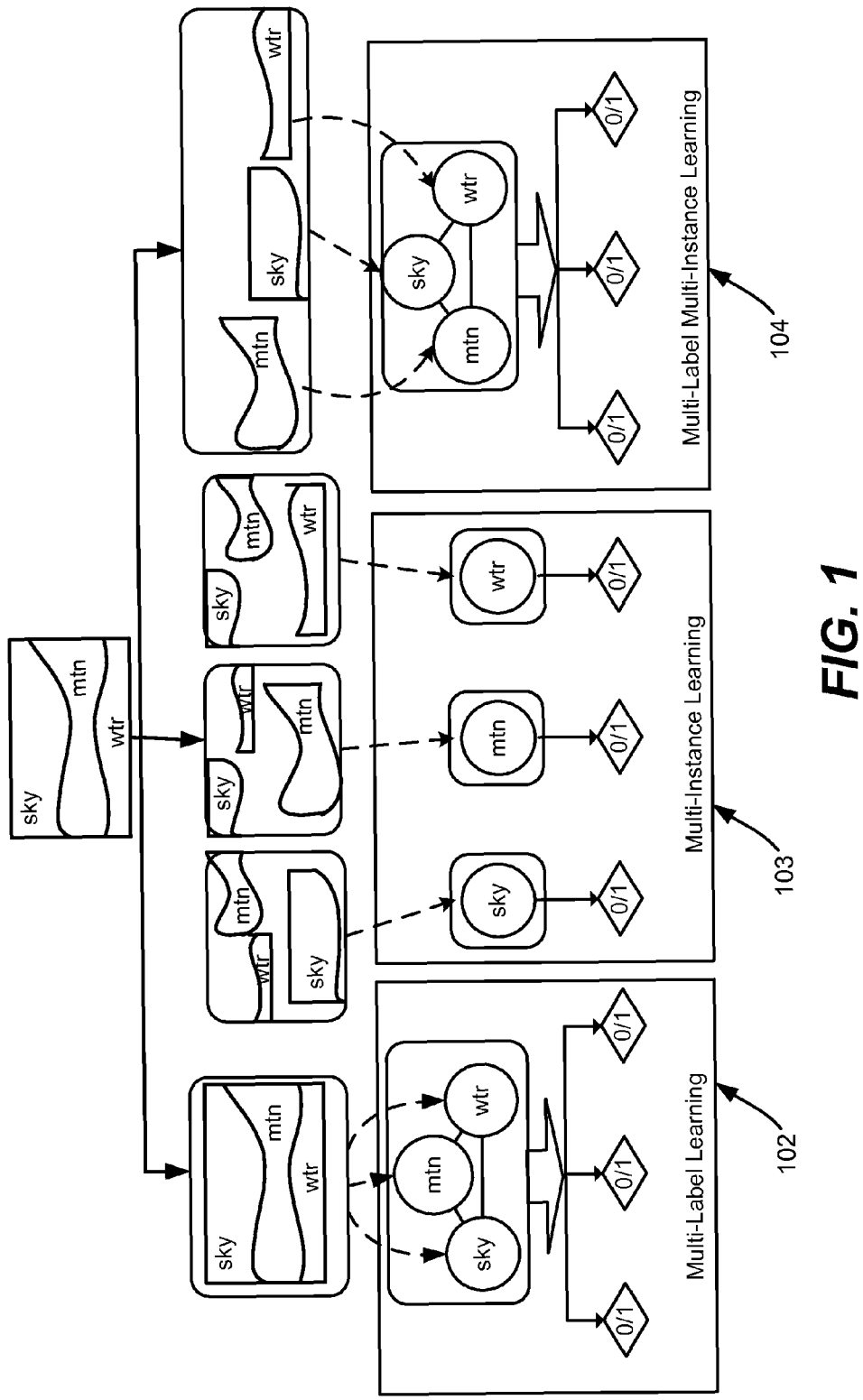
FIG. 1 is a block diagram representing image classification mechanisms, including a multi-label multi-instance classification mechanism.

As generally represented in FIG. 1, there is shown a relative comparison of multi-label classification 102, multi-instance classification 103 and, as described herein, multi-label multi-instance classification (e.g., via a mechanism 104). By way of background, an image is typically described by multiple semantic labels whereby image classification is generally formulated as a multi-label learning problem. A typical multi-label classification 102 solution translates the multi-label learning task into a set of single-label classification problems, e.g., by building an individual classifier for each label such that the labels of a new sample are determined by the outputs of these individual classifiers. This strategy treats labels independently and neglects the correlations among labels. However, semantic labels interact with each other naturally. Note that "mountain" ("mtn" in FIG. 1) and "sky" tend to appear together, while "sky" typically does not appear with "indoor". To exploit these correlations, a contextual fusion step may be performed based on the outputs of the individual classifiers. Other multi-label learning approaches model labels and correlation between labels simultaneously. However, each treat an image as an indiscrete unit and do not capture the semantic meanings of the regions which actually contribute to the multiple labels, and/or cannot model dependencies among the regions.

By way of further background, multi-instance learning-based image classification 103 takes into account the relations between labels and regions. In this solution, an image is regarded as a bag of multiple instances (i.e., regions). When building its classifiers, multi-instance classification 103 only allows labeling images at the image level, instead of labeling at the region level. For a specific semantic label, a bag is labeled positive if at least one instance has the corresponding semantic meaning; otherwise, it is negative. Thus, multi-instance learning depends on which instances contribute to the semantic meaning of the bag-level labels. While different perspectives on contribution have provided different multi-instance learning approaches, they are limited by the single label, and indeed, label correlations are not taken into account in multi-instance learning.

As described above, an image can be described by multiple semantic labels, in which those labels are often closely related to respective regions rather than the entire image. The multi-label multi-instance learning classification mechanism 104 as described herein overcomes the above drawbacks of these prior methods. By together modeling the relations between the labels and regions, as well as the correlations among the multiple labels, the multi-label multi-instance learning classification mechanism 104 solves the multi-label and multi-instance problems in an integrated manner.

Figure 2:
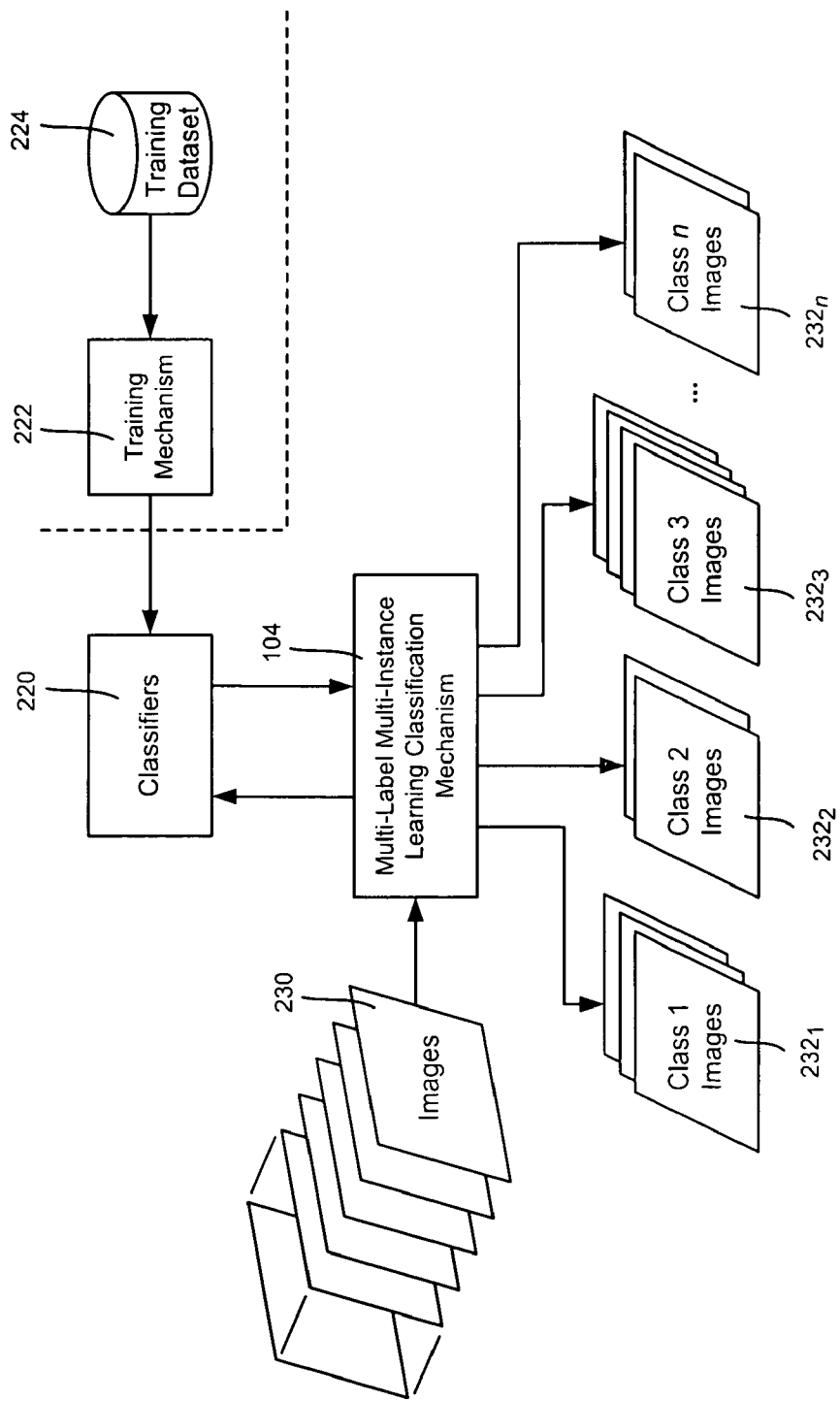
FIG. 2 is a block diagram representing classification of images via a multi-label multi-instance classification mechanism.

FIG. 2 shows a general usage model for multi-label and multi-instance classification mechanism 104. In general, classifiers 220 are trained by a training mechanism 222 based on some training dataset 224; (the dashed line in FIG. 2 suggests that training typically takes place before image classification). The multi-label multi-instance learning classification mechanism 104 uses those classifiers 220 to process images 230 into classes $223_1$-$232_n$. Note that by classification, it does not necessarily mean "grouping" as shown in FIG. 2, but may alternatively (or additionally) refer to associating region and/or image labels with each image as determined below. As will be understood, by together modeling the relations between the labels and regions, as well as the correlations among the multiple labels, the multi-label multi-instance learning classification mechanism 104 as described herein solves the multi-label and multi-instance problems in an integrated manner.

By way of explanation of joint multi-label multi-instance learning, let X and Y denote the feature and label space, respectively. A training dataset 224 (FIG. 2) is denoted by $\{(x^1,y^1), (x^2,y^2), \ldots (x^N,y^N)\}$ where $x^i \in X$ indicates a bag (image) of instances (regions) and $x^i = \{x_1^i, x_2^i, \ldots, x_{R_1}^i\}$. Note that $x_j^i$ denotes the feature vector of the jth instance, while $y^i$ is a K dimensional label vector where $[y_1^i, y_2^i, \ldots, y_K^i]^T$ and $y_k^i \in \{+1,-1\}$. Each entry $y_k^i$ indicates the membership associating $x^i$ with the kth label. A general task is to learn a classification function $f: X \rightarrow Y$ from the training dataset 224. However, the relation between $y^i$ and each instance $x_j^i$ is not explicitly indicated in the training data.

Therefore, an intermediate hidden variable $h_j^i$ for $x_j^i$ is introduced herein, where $h_j^i$ is a binary K-dimensional vector indicating the label vector of each instance. Such hidden variables explicitly capture the semantic meanings of the instances and the connection between the instances and the bag labels. As described below and represented in FIG. 3, an aspect referred to as hidden conditional random fields (HCRF) is able to capture such model structure and thus is used to model the multi-label multi-instance learning problem.

For any image, the posterior distribution of the label vector y given the observation x can be obtained by integrating out the latent variables h. Thus, for multi-label multi-instance learning:

$$p(y \mid x; \theta) = \sum_h p(y, h \mid x; \theta) \qquad (1)$$

$$= \frac{1}{Z(x)} \sum_h \exp\{\phi(y, h, x; \theta)\}6'$$

where $Z(x) = \Sigma_y \Sigma_h \exp(\phi(y,h,x;\theta))$ is a partition function. The function $\phi(y,h,x;\theta)$ is a scale-valued potential function parameterized by $\theta$. For the sake of simplicity, $\theta$ is dropped from the formula in the following context.

Figure 3:
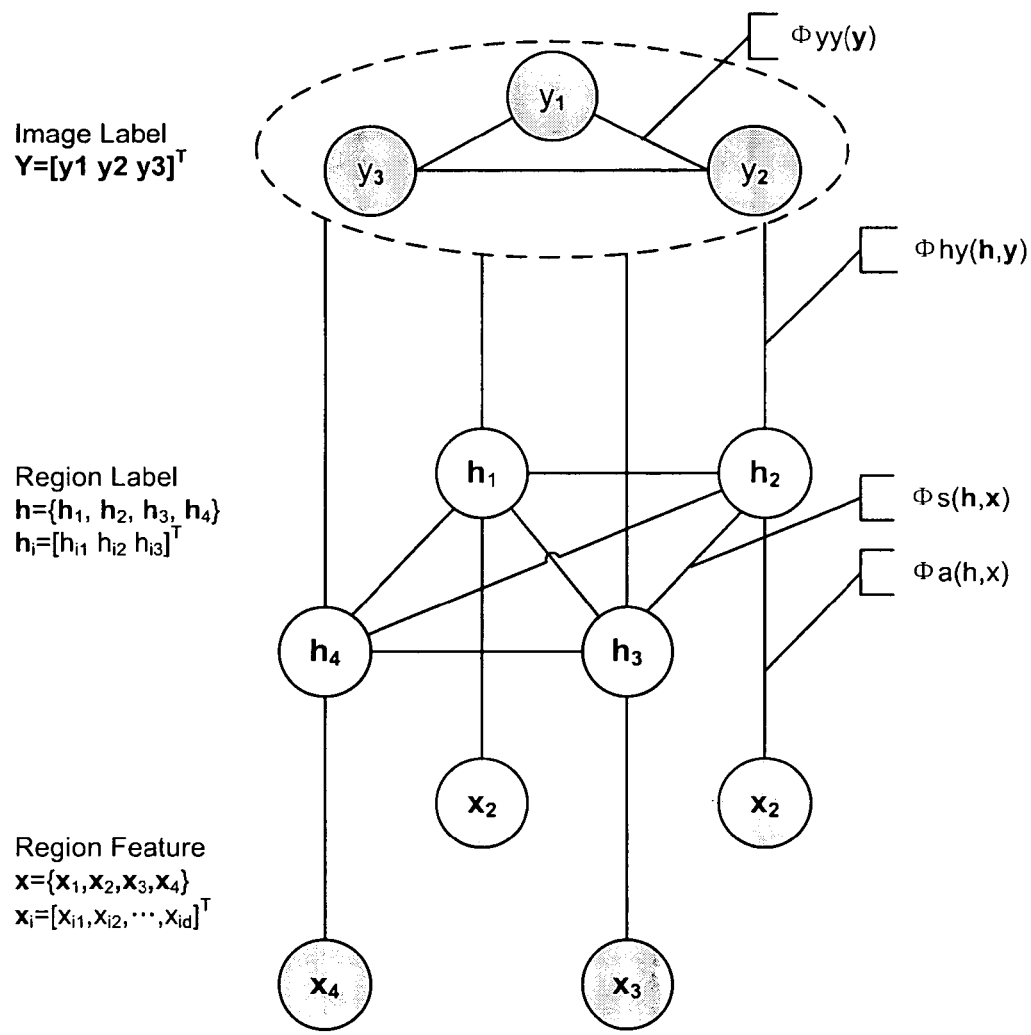
FIG. 3 is a representation of hidden conditional random fields used in modeling multi-label multi-instance learning.

This probabilistic model allows incorporating the correspondence between labels and regions, the spatial relation of the labels, and the correlations of the labels in a single unified formulation. To encode this information, an overall potential function $\Phi$ is decomposed into four component potential functions according to the relationships between those variables:

$$\Phi(y,h,x) = \Phi_a(h,x) + \Phi_s(h,x) + \Phi_{hy}(h,y) + \Phi_{yy}(y) \qquad (2)$$

where $\phi_a$ models the association between hidden labels and the corresponding instances, $\phi_s$ aims to model the spatial dependence among the hidden labels, $\phi_{hy}$ associates the hidden variables to bag labels, and $\phi_{yy}$ models the correlation of bag labels. FIG. 3 shows these relationships (association/dependency/correlation) in a hidden conditional random fields representation.

Note that while formula (2) shows a simple addition of the component potential functions, it is understood that other mathematical combinations may be used. For example, functions may be weighed differently relative to one another.

The association between a region and its label, corresponding to one of the association potential functions, is designed for modeling the latent labels of the regions. A local association potential $\phi(h_j,x_j)$ captures the appearance of each region, which is dependent on the jth region only rather than the entire image; it can be modeled by a local soft classifier. Based on the posterior $p(h_j|x_j;\lambda)$ from the classifier, the association potential is given by $$\phi_a(h, x) = \sum_j \phi(h_j, x_j) \qquad (3)$$

$$= \sum_j \log p(h_j \mid x_j; \lambda) 1 \le j \le R'$$

where $\lambda$ represents the parameters of the classifier and R is the number of regions. In one implementation, the soft classifier is learned using a Support Vector Machine (SVM), (e.g., represented in FIG. 2 as part of the training mechanism 222).

With respect to spatial relation between region labels, this interaction potential function is designed for modeling the spatial dependence between region labels. Intuitively, semantic labels are spatially related. Some labels often occur in the neighboring regions, such as "mountain" and "sky." Such spatial relations can be exploited to improve classification performance. To this end, there is a defined interaction potential to capture the neighboring relationship of each pair of labels:

$$\Phi_\beta(h, x) = \sum_{m,n} \alpha_{m,n} f_{m,n}(h, x) \qquad (4)$$

$$= \sum_{m,n} \alpha_{m,n} \sum_{i,j} \delta[\![h_{i,m} = 1]\!] \delta[\![h_{j,n} = 1]\!] \delta[\![x_i \sim x_j]\!],$$

$$m, n \in \{1, 2, \ldots, K\}, 1 \le i < j \le R$$

where $\delta[\![\cdot]\!]$ is an indicator function that takes on value 1 if the predicate is true and 0 otherwise. The superscript m and n are the label indices. The subscripts i and j are the region indices, and R is the number of regions; $h_{i,m}$ denotes the mth entry of $h_i$, and $X_i \sim X_j$ indicates that region i is adjacent to region j. The weighting parameter is $\alpha_{m,n}$.

The coherence between region and image labels, that is, as represented by the coherence potential function, is designed for modeling the coherence between image labels and region labels. According to the bag-instance setting, for a specific label, an image is labeled positive if at least one region has the corresponding semantic meaning, otherwise, it is negative. To emphasize the consistency between h and y, the commonly-used Ising model may be employed to formulate $\phi_{hy}(h,y)$ as $\gamma v^T y$, which penalizes inconsistency between v and y by a cost $\gamma$. The vector v is a K dimensional label vector, where the ith entry is defined as:

$$v_i = \begin{cases} +1 & \text{if } \exists_{1 \le r \le R} h_{ri} = 1 \\ -1 & \text{if } \forall_{1 \le r \le R} h_{ri} \ne 1 \end{cases}. \quad (5)$$

With respect to correlating image labels, the correlation potential is designed for modeling the label correlations. In real world scenarios, semantic labels do not exist in isolation. Instead, they appear correlatively and naturally interact with each other at the semantic level. For example, "sheep" and "grass" often appear simultaneously, while "fire" and "water" do not commonly co-occur. These correlations can serve as a useful hint to improve the classification performance. The following potential is defined to exploit such correlations:

$$\Phi_{yy}(y) = \sum_{k,l} \sum_{p,q} \mu_{k,l,p,q} f_{k,l,p,q}(y) \quad (6)$$

$$= \sum_{k,l} \sum_{p,q} \mu_{k,l,p,q} \delta[\![y_k = p]\!]\delta[\![y_l = q]\!],$$

$$p, q \in \{+1, -1\}, 1 \le k, l \le K$$

where k and l are the label indices, p and q are the binary labels (positive and negative label); $\mu_{k,l,p,q}$ are weighting parameters.

The potential $\phi_{yy}(y)$ severs to capture the various possible pairs of labels. Note that both the positive and negative relations are captured with this potential. For example, the label pair "car" and "road" is a positive label pair, while "fire" and "water" is a negative label. Note that high-order correlations may also be modeled, however, the cost of employing such statistics may surpass any benefits because of requiring more training samples to estimate more parameters.

Figure 4:
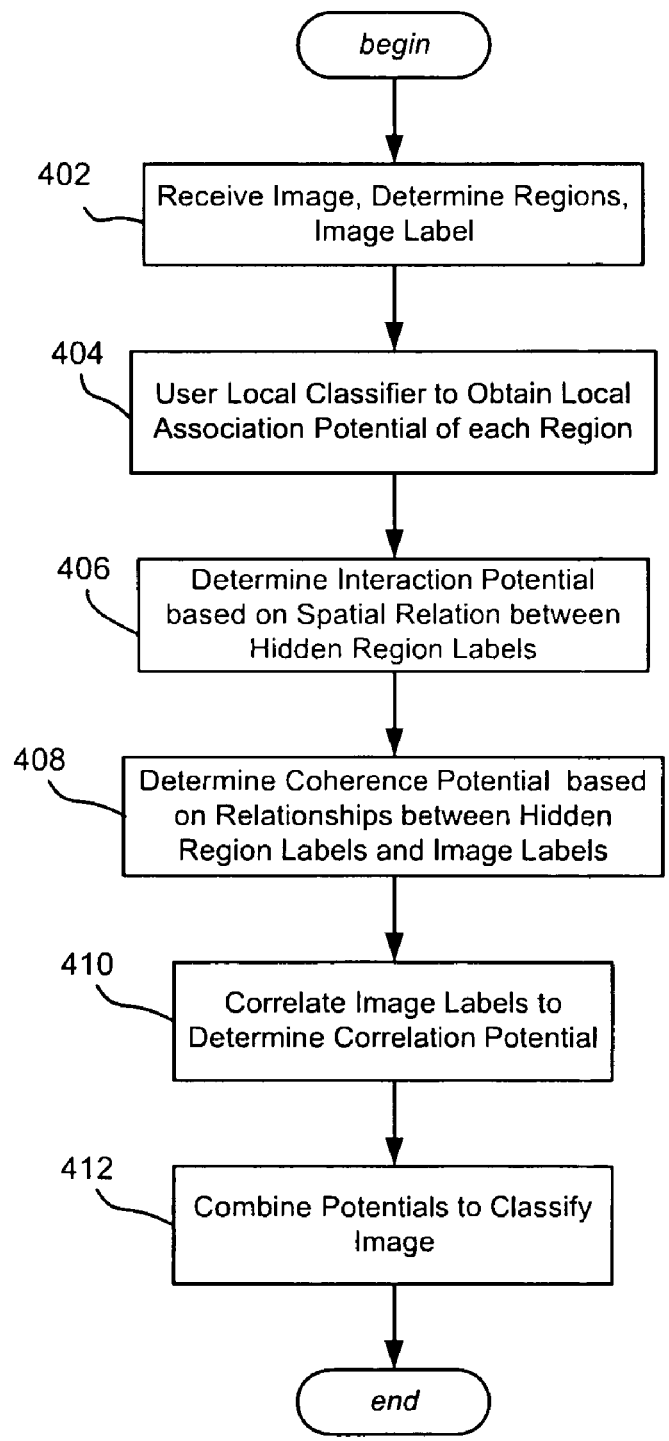
FIG. 4 is a flow diagram showing example steps taken to classify images with a multi-label multi-instance classification mechanism.

FIG. 4 is an example flow diagram that summarizes the various operations performed by the multi-label multi-instance learning classification mechanism 104, beginning at step 402 where an image is received. Step 402 also represents determining the regions, as well as determining image labels.

Steps 404, 406, 408 and 410 represent obtaining the component potential functions; these steps need not be performed in the order shown, and may be performed at least in part in parallel. Step 404 represents determining the local association potential, while step 406 represents determining the interaction potential based on hidden region labels, both of which are described above. Step 408 represents determining the coherence potential based on region and image labels, while step 410 represents determining the correlation potential based on image labels, both of which are likewise described above.

Step 412 represents computing the overall potential function, such as described above with reference to equation (2). Note however that as also mentioned above, other ways of combining the component functions into an overall result are feasible. The image is thus classified using a multi-label multi-instance classification framework.

Turning to various aspects related to training, parameters in one multi-label multi-instance learning model are estimated by penalized maximum likelihood on a set of training examples $\{(x^1,y^1), (x^2,y^2), \ldots (x^N,y^N)\}$ with respect to the conditional distribution:

$$L(\theta) = \langle \log P(y \mid x; \theta) \rangle_{\tilde{\Gamma}} - \frac{1}{2\sigma^2}\|\theta\|^2 \quad (7)$$

$$= \left\langle \log \sum_h P(y, h \mid x; \theta) \right\rangle_{\tilde{\Gamma}} - \frac{1}{2\sigma^2}\|\theta\|^2$$

where $\tilde{\Gamma}$ denotes the denotes the empirical distribution. $\langle \cdot \rangle_{\tilde{\Gamma}}$ denotes the expectation with respect to distribution $\tilde{\Gamma}$. i indexes the training sample. The first term in Equation (8) is the log-likelihood of the training data. The second term is a penalization factor to improve the model's generalization ability. It is the log of a Gaussian prior with variance $\sigma^2$, i.e., $$p(\theta) \sim \exp\left(-\frac{1}{2\sigma^2}\|\theta\|^2\right).$$

However, it is difficult to optimize $L(\theta)$ directly. Instead, an Expectation Maximization (EM) algorithm may be used to solve this optimization problem as follows.

E-Step: Given the current tth step parameter estimation $\theta^{(t)}$, the Q-function (i.e., the expected value of $L(\theta)$ under the current parameter estimates) can be written as:

$$Q(\theta, \theta^{(t)}) = \langle E_{h|y,x;\theta^{(t)}} \log\left(p(y, h \mid x; \theta)\right) \rangle_{\tilde{\Gamma}} - \frac{1}{2\sigma^2}\|\theta\|^2, \quad (8)$$

where $E_{h|y,x;\theta^{(t)}}$ is the expectation operator given the concurrent estimated conditional probability $p(h|y,x;\theta^{(t)})$.

M-Step: A new parameter vector $\theta^{(t+1)}$ is updated by maximizing the Q-function:

$$\theta^{(t+1)} = \underset{\theta}{\arg\max} Q(\theta, \theta^{(t)}). \quad (9)$$

The derivatives of Q-function with respect to its parameters are:

$$\frac{\partial Q}{\partial \gamma} = \langle E_{h|y,x;\theta^{(t)}} v^T y \rangle_{\tilde{\Gamma}} - \langle v^T y \rangle_{\Gamma} - \frac{1}{\sigma^2}\gamma \quad (10)$$

$$\frac{\partial Q}{\partial \alpha_{m,n}} = \langle E_{h|y,x;\theta^{(t)}} f_{m,n} \rangle_{\tilde{\Gamma}} - \langle f_{m,n} \rangle_{\Gamma} - \frac{1}{\sigma^2}\alpha_{m,n}$$

$$\frac{\partial Q}{\partial \mu_{k,l,p,q}} = \langle E_{h|y,x;\theta^{(t)}} f_{k,l,p,q} \rangle_{\tilde{\Gamma}} - \langle f_{k,l,p,q} \rangle_{\Gamma} - \frac{1}{\sigma^2}\mu_{k,l,p,q},$$

where $\Gamma$ is the model distribution.

Given the above derivatives, a gradient-based algorithm may be used to maximize $Q(\theta,\theta^{(t)})$. However, such a procedure requires computing the expectation under model distribution, which is NP-hard due to the partition function. To overcome this difficulty, various approximate inference algorithms can be used. One such solution is a sampling-based method such as Markov chain Monte Carlo (MCMC); however, sampling-based methods may take a large number of iterations to converge. Instead, a contrastive divergence (CD) algorithm is used, which only needs to take a few steps in the Markov chain to approximate the gradients. This property of contrastive divergence often leads to significant savings, particularly when the inference algorithm will be repeatedly invoked during the model training.

With respect to inference, given a new image x, the inference is to find the optimal label configuration y. A widely-used criteria for inferring labels from the posterior distribution is Maximum Posterior Marginal (MPM), which is adopted herein. The computation of MPM requires marginalization over a large number of variables, which is generally NP-hard. To address this difficulty, a frequently-used approximate inference method is adopted, Gibbs sampling, because of its fast convergence. A reasonable initial point for the sampling can be obtained by considering the outputs of the local classifier. Using a similar approach, the region label vector h is estimated.

As can be seen, there is provided a multi-label multi-instance learning framework for image classification. The framework models both the relation between semantic labels and regions and the correlations among the labels in an integrated manner. Also, the framework works with dependence between regions, such as the spatial configuration of the region labels. Testing shows that the framework provides high classification accuracy on the image and region level, and is robust to different datasets.

Exemplary Operating Environment

Figure 5:
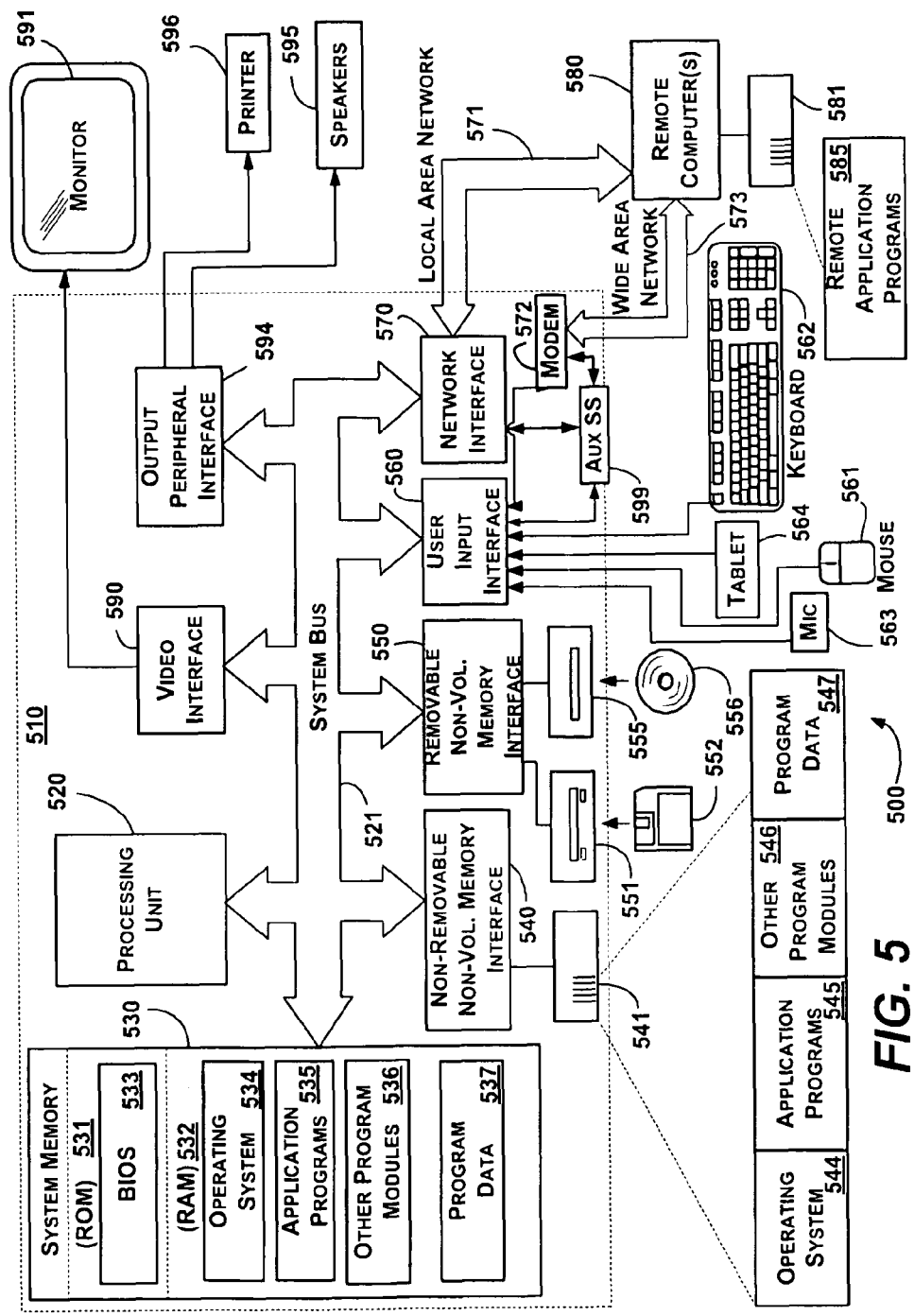
FIG. 5 shows an illustrative example of a computing environment into which various aspects of the present invention may be incorporated.

FIG. 5 illustrates an example of a suitable computing and networking environment 500 on which the examples and/or implementations of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, embedded systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 555 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 545 and program data 547. Note that these components can either be the same as or different from operating system 534, application programs 535, other program modules 535, and program data 537. Operating system 544, application programs 545, other program modules 545, and program data 547 are given different numbers herein to illustrate that, at a minimum, they are different copies. A user may enter commands and information into the computer 510 through input devices such as a tablet, or electronic digitizer, 554, a microphone 553, a keyboard 552 and pointing device 551, commonly referred to as mouse, trackball or touch pad. Other input devices not shown in FIG. 5 may include a joystick, game pad, satellite dish, scanner, or the like. These and other input devices are often connected to the processing unit 520 through a user input interface 550 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 595, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 550 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 550 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
classifying an image, including obtaining image label data corresponding to the image, obtaining hidden region label data corresponding to regions in the image, and combining the image label data and the hidden region label data to classify the image, wherein obtaining the image label data comprises at least one of determining a coherence potential based on relationships between hidden region labels and image labels or determining a correlation potential based on relationships between the image labels.

2. The method of claim 1 wherein obtaining the hidden region label data comprises determining a local association potential of each region.

3. The method of claim 1 wherein obtaining the hidden region label data comprises determining an interaction potential based on relationships between hidden region labels.

4. The method of claim 1 wherein obtaining the image label data comprises obtaining one or more image labels, and wherein obtaining the hidden region label data comprises obtaining hidden region labels.

5. The method of claim 1 wherein obtaining the hidden region label data comprises determining a local association potential of each region and determining an interaction potential based on relationships between the hidden region labels.

6. The method of claim 1 wherein obtaining the image label data comprises obtaining one or more image labels and determining a correlation potential based on relationships between image labels, and further comprising determining a coherence potential based on relationships between the region and image labels, and wherein combining the image label data and hidden region label data comprises mathematically combining the local association potential, the interaction potential, the correlation potential and the coherence potential.

7. The method of claim 6 wherein mathematically combining comprises adding the local association potential, the interaction potential, the correlation potential and the coherence potential.

8. The method of claim 6 wherein mathematically combining comprises determining a weight for each potential, and using the weights in adding the local association potential, the interaction potential, the correlation potential and the coherence potential.

9. The method of claim 1 further comprising, training at least one classifier used in obtaining the image label data or the hidden region label data.

10. In a computing environment, a system comprising:
at least one classifier;
a multi-label multi-instance learning classification mechanism configured to classify an image using the at least one classifier, wherein the at least one classifier is configured to obtain image label data corresponding to the image and to obtain hidden region label data corresponding to regions in the image, wherein the mechanism is configured to combine the image label data and the hidden region label data to classify the image, and wherein the at least one classifier is further configured to determine at a correlation potential based on relationships between image labels.

11. The system of claim 10 wherein the mechanism is configured to obtain the hidden region label data by using the at least one classifier to determine a local association potential of each region and determining an interaction potential based on relationships between hidden region labels.

12. The system of claim 10 wherein the mechanism is configured to obtain the image label data and the hidden region label data by using the at least one classifier to determine image and hidden region labels, the mechanism further configured to determine a coherence potential based on relationships between the region and image labels.

13. The system of claim 10 wherein the mechanism is configured to obtain the image label data and the hidden region label data comprising a coherence potential based on relationships between the region and image labels, a local association potential of each region, an interaction potential based on relationships between hidden region labels, and a correlation potential based on relationships between image labels.

14. The system of claim 13 wherein the mechanism is configured to classify the image based on a mathematical combination of the local association potential, the interaction potential, the correlation potential and the coherence potential into an overall potential.

15. The system of claim 14 wherein the mechanism is further configured to mathematically combine the local association potential, the interaction potential, the correlation potential and the coherence potential into an overall potential by determining a weight for each potential, and using the weights in adding the local association potential, the interaction potential, the correlation potential and the coherence potential.

16. The system of claim 10 further comprising, training means coupled to the multi-label multi-instance learning classification mechanism.

17. One or more tangible computer-readable storage media storing computer-executable instructions, which when executed perform steps, comprising:
processing an image into multi-label, multi-instance data, including determining a local association potential based on each region of an image, determining an interaction potential based on relationships between hidden region labels of the image, determining a correlation potential based on relationships between image labels of the image, and determining a coherence potential based on relationships between the region and image labels; and
combining the local association potential, the interaction potential, the correlation potential and the coherence potential to classify the image.

18. The one or more tangible computer-readable storage media of claim 17 storing further computer-executable instructions comprising, associating one or more labels with the image to classify the image.

19. The one or more tangible computer-readable storage media of claim 17 storing further computer-executable instructions comprising, training at least one classifier to provide at least part of the multi-label, multi-instance data.

20. The one or more tangible computer-readable storage media of claim 19 wherein training comprises using at least one approximate inference method.

* * * * *